2,793,215

2,5-BIS-(SUBSTITUTED-MERCAPTO)-3,4-DICYANO-PYRROLES AND THEIR PREPARATION

William J. Middleton, Claymont, Del., assignor to E. I. du Pont de Nemours and Company, Wilmington, Del., a corporation of Delaware No Drawing. Application April 20, 1955, Serial No. 502,715

22 Claims. (Cl. 260—326.5)

This invention relates to new substituted pyrroles and to their preparation. More particularly this invention relates to new substituted pyrroles which have attached to the carbon atoms of the pyrrole nucleus a plurality of cyano groups and a plurality of organic substituted mercapto groups or the corresponding sulfoxide or sulfone groups.

Pyrrole is a five-membered nitrogen-containing heterocyclic compound which contains two nuclear carbon-to-carbon unsaturations. The compound has somewhat unexpected properties in that it and its unsaturation resemble that of benzenoid compounds in many respects. The pyrrole nucleus occurs in natural products such as in the porphyrins of chlorophyll and hemoglobin. Although pyrroles have interesting properties, investigations heretofore have been primarily directed to pyrroles having carboxylic acid and hydrocarbon groups attached to nuclear carbons.

It is an object of this invention to provide new substituted pyrroles and a process for their preparation. A further object is to provide new substituted pyrroles which have attached to the carbon atoms of the pyrrole nucleus a plurality of cyano groups and a plurality of organic substituted mercapto groups or the corresponding sulfoxide or sulfone groups. A still further object is to provide novel substituted pyrroles from selected substituted butadienes. Other objects will appear hereinafter.

These and other objects of this invention are obtained by providing substituted pyrroles in which each of the nuclear carbon atoms bonded to nuclear nitrogen bears an

group wherein R is an organic radical of up to 10 carbons bonded to sulfur by aliphatic carbon and $n$ is a cardinal number of 0 to 2, and each of the remaining carbon atoms of the pyrrole nucleus bears a cyano group. The new compounds of this invention are pyrroles which have no hydrogen on nuclear carbon. They have two cyano groups and two —SR groups wherein the sulfur is directly attached to the nuclear carbon atoms which are attached to nuclear nitrogen of the pyrrole ring. The sulfur of the —SR groups can have optionally attached to it up to two oxygen atoms. Thus, the

group designates the substituted mercapto group and the corresponding sulfoxide and sulfone. R can be any organic radical of up to 10 carbons providing it is attached to sulfur by an aliphatic carbon. Suitable radicals include hydrocarbon such as benzyl and vinyl, alkyl, hydroxyalkyl, haloalkyl, chloroalkyl, cyanoalkyl and pyridilium-alkyl radicals. The group —SR is any organic substituted-mercapto (organic thio) group of up to 10 carbons in which the radical R is attached to sulfur by aliphatic carbon. Suitable —SR groupings include hydrocarbonmercapto (hydrocarbonthio), such as alkylmercapto (alkylthio), benzylmercapto (benzylthio), and vinylmercapto (vinylthio); hydroxyalkylmercapto (hydroxyalkylthio); haloalkylmercapto (haloalkylthio), such as chloroalkylmercapto (chloroalkylthio); cyanoalkylmercapto (cyanoalkylthio); and pyridilium-alkylmercapto (pyridilium-alkyl).

The new pyrroles of this invention have substituents on all of the nuclear carbons and have the structural formula

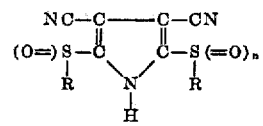

wherein $n$ is a cardinal number of 0 to 2, and R is an organic radical of up to 10 carbons, preferably of not more than 7 carbons, attached to sulfur by an aliphatic carbon and preferably by a methylene, —CH$_2$—, group. The radical R includes hydrocarbons which are bonded to sulfur by aliphatic carbon, such as benzyl, vinyl and alkyl radicals. The lower (one to five carbon) alkyls, such as methyl, propyl and amyl are a particularly preferred class. Aliphatic radicals which contain elements including oxygen, nitrogen and halogen are also useful. Examples of such radicals are furfuryl, beta-hydroxyethyl, beta-chloroethyl, beta-cyanoethyl and beta-pyridiliumethyl groups.

The new substituted pyrroles of this invention are obtained by contacting an aqueous solution of a strong mineral acid with a substituted butadiene in which each of the central carbon atoms of the butadiene nucleus bears a cyano group and each of the terminal carbon atoms of the butadiene nucleus bears an amino group and an organic substituted mercapto group of not more than 10 carbon atoms in which the organic group is bonded to sulfur by aliphatic carbon. When an oxidizing agent, such as hydrogen peroxide, is present in this reaction, sulfur undergoes oxidation to give the corresponding sulfoxy or sulfone derivatives.

These substituted butadienes which are employed to give the disubstituted mercaptopyrroles of this invention are 1,4 - diamino - 2,3 - dicyano-1,4,-bis(substituted-mercapto)butadienes having the general formula

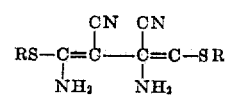

where R is an organic radical of up to 10 carbon atoms, and preferably of not more than 7 carbon atoms, bonded by aliphatic carbon to the sulfur atom. R in these substituted butadienes and in the new pyrroles of this invention can be hydrocarbon groups which are bonded to sulfur by aliphatic carbon, such as benzyl, vinyl or alkyl, particularly the lower alkyls, e. g., methyl, ethyl, propyl, butyl or amyl. R can also be an aliphatic radical that contains substituents which include oxygen, nitrogen or halogen, e. g., as in haloalkyl or chloroalkyl, such as beta-chloroethyl; hydroxyalkyl, such as beta-hydroxyethyl; and cyanoalkyl, such as beta-cyanoethyl.

The new pyrroles within the scope of this invention are obtained by the decomposition in the presence of strong mineral acid, of the 1,4-diamino-2,3-dicyano-1,4-bis(substituted-mercapto)butadienes defined above. The pyrroles thus obtained have an acidic hydrogen on the nuclear pyrrole nitrogen. This can be converted to a salt group by treatment with a base and alkylated by suitable alkylating reagents.

The following examples in which the parts are by weight illustrate the preparation and properties of new compositions within the scope of this invention.

EXAMPLE I

2,5-bis(methylmercapto)-3,4-dicyanopyrrole

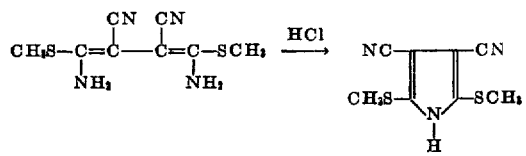

A mixture of 100 parts of water, 56 parts of 36% hydrochloric acid, 120 parts of ethanol, and 17 parts of 1,4-diamino - 1,4 - bis(methylmercapto)-2,3-dicyanobutadiene was heated under reflux with stirring until all solid material had gone into solution. This required about 30 minutes. The solution was cooled, and a white crystalline precipitate formed. The precipitate was collected on a filter and washed with water. Water was added to the filtrate, and an additional amount of precipitate formed. This precipitate was also collected, combined with the first precipitate, and recrystallized from ethyl alcohol. There was obtained 13 parts of 2,5-bis(methylmercapto)-3,4-dicyanopyrrole in the form of long white needles, M. P. 224–225° C.

*Analysis.*—Calcd. for $C_8N_3H_7S_2$: C, 45.91; H, 3.37; N, 20.08; S, 30.64. Found: C, 46.04; H, 3.44; N, 20.40; S, 30.24.

EXAMPLE II

2,5-bis(ethylmercapto)-3,4-dicyanopyrrole

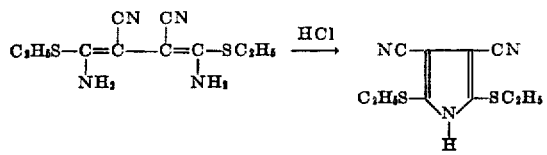

A mixture of 0.5 part of 1,4-diamino-1,4-bis-(ethylmercapto)2,3-dicyanobutadiene and 11 parts of 5% hydrochloric acid was heated to boiling for 5 minutes, and 4 parts of alcohol was then added. The heating was continued until all of the solid had gone into solution. The solution was cooled, and the white crystals which separated were collected on a filter, washed with water, and recrystallized from alcohol-water. There was obtained 0.3 part of 2,5-bis(ethylmercapto)-3,4-dicyanopyrrole in the form of white plates, M. P. 140–141° C.

*Analysis.*—Calcd. for $C_{10}H_{11}N_3S_2$: C, 50.60; H, 4.67; N, 17.71; S, 27.02. Found: C, 50.97; H, 4.33; N, 17.62; S, 27.38.

EXAMPLE III

2,5-bis(beta-hydroxyethylmercapto)-3,4-dicyanopyrrole

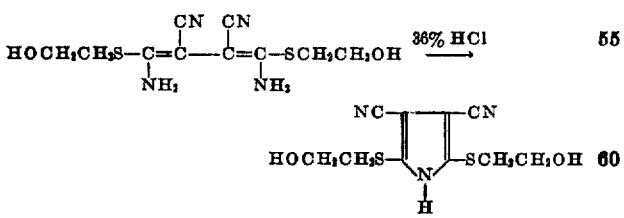

A solution of 25 parts of 1,4-diamino-1,4-bis(beta-hydroxyethylmercapto) - 2,3 - dicyanobutadiene in 120 parts of 36% hydrochloric acid was allowed to evaporate at room temperature in a draft of air. The solid residue was collected on a filter, washed with water, and recrystallized from water. There was obtained 13.0 parts (55% yield) of 2,5-bis(beta-hydroxyethylmercapto)-3,4,-dicyanopyrrole in the form of white plates, M. P. 108–110° C.

*Analysis.*—Calcd. for $C_{10}H_{11}N_3O_2S_2$: C, 44.59; H, 4.12; N, 15.61; S, 23.81; M. W., 269.3. Found: C, 44.79; H, 3.74; N, 15.75; S, 23.85; N. E., 266; pKa, 7.6.

EXAMPLE IV

2,5-bis(beta-chloroethylsulfonyl)-3,4-dicyanopyrrole and its salts

PART A. — PREPARATION FROM 1,4-DIAMINO-2,3-DICYANO - 1,4 - BIS(BETA - HYDROXYETHYLMERCAPTO) BUTADIENE

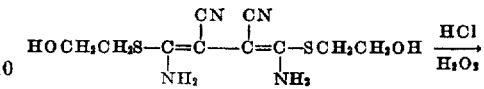

One hundred parts of 1,4-diamino-2,3-dicyano-1,4-bis(beta-hydroxyethylmercapto)butadiene was slowly added to a stirred solution of 1200 parts of 36% hydrochloric acid. When all of the solid had dissolved, the solution was cooled to 0° C. and about 300 parts of 30% hydrogen peroxide was added dropwise at such a rate that the temperature did not rise above 5° C. When the addition was completed, the solution was stirred for 3 hours longer at ice-bath temperature and then allowed to slowly warm to room temperature. The white solid (90 parts, 65% yield) which formed was collected on a filter, washed with water, and recrystallized from water. There was obtained 65 parts of 2,5-bis-(beta-chloroethylsulfonyl)-3,4-dicyanopyrrole in the form of white needles, M. P. 210–212° C.

PART B. — PREPARATION OF 2,5-BIS(BETA-CHLOROETHYLSULFONYL)-3,4-DICYANOPYRROLE FROM 3,4-DICYANO - 2,5 - BIS(BETA-HYDROXYETHYLTHIO)PYRROLE

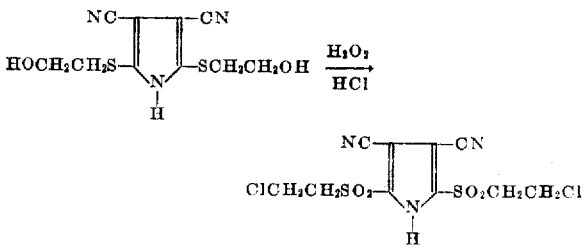

The same compound was alternately prepared by oxidation of the pyrrole of Example III according to the following process:

A solution of 4.25 parts of 3,4-dicyano-2,5-bis(beta-hydroxyethylmercapto)pyrrole in 60 parts of 36% hydrochloric acid was cooled at 0° C., and about 25 parts of 30% hydrogen peroxide was added dropwise to the stirred solution at such a rate that the temperature was kept below 10° C. at all time. After the addition, the solution was stirred for 2 hours at ice-bath temperature and then allowed to slowly warm to room temperature. The white solid (4.0 parts, 69% yield) which formed was collected on a filter, washed with water, and recrystallized from water. 2,5-bis(beta-chloroethylsulfonyl)-3,4-dicyanopyrrole was obtained in the form of white needles, M. P. 210–212° C.

*Analysis.*—Calcd. for $C_{10}H_9N_3S_2Cl_2O_4$: C, 32.44; H, 2.45; N, 11.35; S, 17.32; Cl, 19.15. Found: C, 32.55; H, 2.64; N, 11.38; S, 17.40; Cl, 19.26; pKa, 2.6.

PART C.—PREPARATION OF TETRAMETHYLAMMONIUM SALT OF 2,5-BIS(BETA-CHLOROETHYLSULFONYL)-3,4-DICYANOPYRROLE

The filtrate from the recrystallization of this product was mixed with a solution of 5 parts of tetramethylammonium chloride in 10 parts of water. The white precipitate which formed was collected on a filter, washed with water, and recrystallized from water. There was obtained 0.34 part of the tetramethylammonium salt of 2,5-bis-(beta-chloroethylsulfonyl)-3,4-dicyanopyrrole in the form of long white needles, M. P. 185–186° C. Acidic pyrroles of the above type form crystalline derivatives of amines analogous to those formed by picric acid.

*Analysis.*—Calcd. for $C_{14}H_{20}S_2N_4Cl_2O_4$:

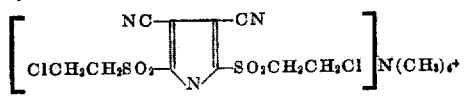

C, 37.92; H, 4.55; N, 12.64; S, 14.46; Cl, 15.99. Found: C, 37.94; H, 4.55; N, 12.71; S, 14.66; Cl, 16.41.

EXAMPLE V

*2,5-bis(2-[1-pyridylium]ethylsulfonyl)-3,4-dicyanopyrrolide chloride dihydrate*

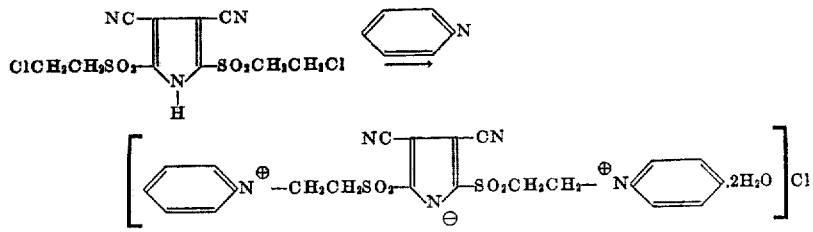

A solution of 5.0 parts of 2,5-bis(beta-chloroethylsulfonyl)-3,4-dicyanopyrrole (Example IV) in 25 parts of pyridine was allowed to stand at room temperature for two hours and then heated under reflux for five minutes. The white precipitate which formed was collected on a filter and washed with ether. There was obtained 4.5 parts of a white powder. This material was recrystallized from water to give 3.7 parts of the salt, $C_{20}H_{18}N_5S_2O_4Cl \cdot 2H_2O$ 

in the form of white needles which melted first at 158–160° C., resolidified and then remelted at 245–248° C.

*Analysis.*—Calcd. for $C_{20}H_{22}N_5S_2O_6Cl$: C, 45.49; H, 4.20; N, 13.27; S, 12.14; Cl, 6.72. Found: C, 44.59; H, 4.33; N, 13.16; S, 12.00; Cl, 6.70.

In addition to the compounds described in the examples, the following are included in this invention: 2,5-bis(amylmercapto) - 3,4 - dicyanopyrrole, 2,5 - bis(methylsulfonyl) - 3,4 - dicyanopyrrole, 2,5 - bis(methylsulfinyl) - 3,4 - dicyanopyrrole, 2,5 - bis(benzylmercapto) - 3,4 - dicyanopyrrole, 2,5 - bis(furfurylmercapto) - 3,4 - dicyanopyrrole, 2,5 - bis(beta - cyanoethylmercapto) - 3,4 - dicyanopyrrole, and 2,5-bis(vinylmercapto)-3,4-dicyanopyrrole.

The new pyrroles are acidic due to the presence of hydrogen on the pyrrole nitrogen. They can be converted to salts such as alkali metal or ammonium salts which have increased solubility in water.

The sulfoxides and sulfonyl compounds are also included within the scope of this invention. These compounds, i. e., those of the general formula wherein $n$ is 1 to 2, are obtained by the mild oxidation of the substituted mercaptans, i. e., those wherein $n=0$. The use of equivalent amounts of hydrogen peroxide or other mild oxidizing agent for each sulfide group gives the sulfoxide. The sulfonyl compounds are obtained when the amount of oxidizing agent is increased.

The new pyrroles of this invention having attached to nuclear carbon two cyano groups and two substituted mercapto groups, such as alkylmercapto or substituted alkyl-mercapto groups, are obtained by the treatment with aqueous solution of a strong mineral acid (pKa of no greater than 3) of a 1,4-diamino-2,3-dicyano-1,4-bis(substituted-mercapto)butadiene is previously defined. Although dilute acids can be used at elevated temperature, e. g., up to 100° C., it is preferred that concentrated acids be employed at lower temperatures, preferably 0 to 50° C. In addition to hydrochloric acid, sulfuric acid of up to 50% concentration can be used. Other mineral acids such as hydrobromic are useful. The preferred concentrations are 10 to 40% of acid in water. Non-reactive water-soluble organic solvents such as alcohol can be present during the reaction. Such solvents facilitate the reaction by providing a homogeneous system.

The 1,4-diamino-2,3-dicyano-1,4-bis(substituted-mercapto)butadienes are obtained by the base catalyzed reaction of excess mercaptan with either tetracyanoethylene or tetracyanoethane as disclosed and claimed in my copending U. S. patent application, Serial No. 491,512, filed March 1, 1955. For example 1,4-diamino-2,3-dicyano-1,4-bis(beta-hydroxyethylmercapto)butadiene can be obtained as follows:

A solution of 12.8 parts of tetracyanoethylene in 55 parts of acetone was mixed with a solution of 2 parts of triethylamine in about 30 parts of beta-mercaptoethanol. The resultant solution was cooled in an ice-bath for ten minutes, and then poured into 1000 parts of water. After standing at room temperature for about one hour, the crystalline precipitate which formed was collected on a filter, washed with water, and dried. There was obtained 22.5 parts (81% yield) of 1,4-diamino-2,3-dicyano-1,4-bis(beta-hydroxyethylmercapto)butadiene in the form of long, white, highly refractive needles, M. P. 176–177° C.

The tetracyanoethylene was prepared as disclosed in Cairns and Graef U. S. patent application Serial No. 382,842, filed September 28, 1953, by reaction of sulfur monochloride with malononitrile as in the following procedure:

Sulfur monochloride (70 parts) was added slowly during the course of six hours to a refluxing solution of 33 parts of malononitrile in about 600 parts of chloroform. After the mixture refluxed for an additional 20 hours, the chloroform was removed by heating on a steam bath. The crystalline residue was extracted with diethyl ether in a Soxhlet extractor. Evaporation of the ether extract gave crude tetracyanoethylene which was further purified by sublimation at 100° C. under a pressure of 1–2 mm.

Tetracyanoethane, which can be employed in place of the tetracyanoethylene, is obtainable from the latter by reduction, e. g., with hydrogen or with a mercaptan as disclosed in Heckert U. S. patent application Serial No. 421,997, filed April 8, 1954, as follows:

A solution of 19.2 parts of tetracyanoethylene in about 60 parts of acetone was cooled in an ice bath and about 30 parts of mercaptoacetic acid added. The white needles were recrystallized from acetone/water solution to give pure tetracyanoethane.

The new pyrroles of this invention are useful as intermediates in the production of pyrrole containing dyes and pigments. They are useful as rubber accelerators, e. g., 2,5 - bis(beta - hydroxyethylmercapto) - 3,4 - dicyanopyrrole when compounded with polychlorobutadiene accelerated the curing of the latter synthetic rubber. The sulfonyl and sulfoxy compounds are useful as leather tanning agents.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound selected from the class consisting of substituted pyrroles and their alkali metal and ammonium salts, said substituted pyrroles having the structural formula

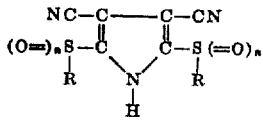

wherein $n$ is a cardinal number from 0 to 2, and R is a radical containing at least one aliphatic carbon and not more than 7 carbon atoms which is bonded to sulfur by aliphatic carbon and is selected from the class consisting of hydrocarbon, hydroxyalkyl, haloalkyl, cyanoalkyl and pyridilium-alkyl radicals.

2. A substituted pyrrole in which each of the nuclear carbon atoms bonded to nuclear nitrogen bears a

group wherein R is a hydrocarbon radical containing at least one aliphatic carbon and not more than 7 carbon atoms which is bonded to sulfur by aliphatic carbon and $n$ is cardinal number of 0 to 2, and each of the remaining carbon atoms of the pyrrole nucleus bears a cyano group.

3. A substituted pyrrole in which each of the nuclear carbon atoms bonded to nuclear nitrogen bears a —SR group wherein R is an alkyl radical of up to 7 carbon atoms, and each of the remaining carbon atoms of the pyrrole nucleus bears a cyano group.

4. A substituted pyrrole in which each of the nuclear carbon atoms bonded to nuclear nitrogen bears an

group wherein R is a hydroxyalkyl radical of up to 7 carbon atoms and $n$ is a cardinal number of 0 to 2, and each of the remaining carbon atoms of the pyrrole nucleus bears a cyano group.

5. A substituted pyrrole in which each of the nuclear carbon atoms bonded to nuclear nitrogen bears an —SR group wherein R is a hydroxyalkyl radical of up to 7 carbon atoms, and each of the remaining carbon atoms of the pyrrole nucleus bears a cyano group.

6. A substituted pyrrole in which each of the nuclear carbon atoms bonded to nuclear nitrogen bears an

group wherein R is a haloalkyl radical of up to 7 carbon atoms and $n$ is a cardinal number of 0 to 2, and each of the remaining carbon atoms of the pyrrole nucleus bears a cyano group.

7. A substituted pyrrole in which each of the nuclear carbon atoms bonded to the nuclear nitrogen bears an

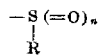

group where R is a chloroalkyl radical of up to 7 carbon atoms, and each of the remaining carbon atoms of the pyrrole nucleus bear a cyano group.

8. A substituted pyrrolide in which each of the nuclear carbon atoms bonded to the nuclear nitrogen bears an

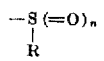

group wherein R is a pyridylium-alkyl radical of up to 7 carbon atoms and $n$ is a cardinal number of 0 to 2, and each of the remaining carbon atoms of the pyrrolide nucleus bears a cyano group.

9. 2,5-bis(methylmercapto) - 3,4 - dicyanopyrrole.

10. 2,5 - bis(beta - hydroxyethylmercapto) - 3,4 -dicyanopyrrole.

11. 2,5 - bis(beta - chloroethylsulfonyl) - 3,4 - dicyanopyrrole.

12. 2,5 - bis(2 - [1 - pyridylium]ethylsulfonyl) - 3,4-dicyanopyrrolide chloride dihydrate.

13. 2,5 - bis(ethylmercapto) - 3,4 - dicyanopyrrole.

14. Process for preparing substituted pyrroles which comprises contacting an aqueous solution of a strong mineral acid having a pKa of no greater than 3 with a substituted butadiene having the structural formula

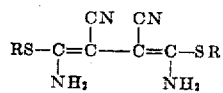

wherein R is a radical containing at least one aliphatic carbon and not more than 7 carbon atoms which is bonded to sulfur by aliphatic carbon and is selected from the class consisting of hydrocarbon, hydroxyalkyl, haloalkyl, and cyanoalkyl radicals.

15. Process for preparing substituted pyrroles which comprises contacting an aqueous solution of a strong mineral acid having a pKa of no greater than 3 with a substituted butadiene in which each of the central carbon atoms of the butadiene nucleus bears a cyano group and each of the terminal carbon atoms of the butadiene nucleus bear an amino group and a hydroxyalkylmercapto group of not more than 7 carbon atoms.

16. Process for preparing substituted pyrroles which comprises contacting an aqueous solution of a strong mineral acid having a pKa of no greater than 3 and a peroxide with a substituted butadiene in which each of the central carbon atoms of the butadiene nucleus bears a cyano group and each of the terminal carbon atoms of the butadiene nucleus bears an amino group and a hydroxyalkylmercapto group of not more than 7 carbon atoms.

17. Process for preparing substituted pyrroles which comprises contacting an aqueous solution of a strong mineral acid having a pKa of no greater than 3 with a substituted butadiene in which each of the central carbon atoms of the butadiene nucleus bears a cyano group and each of the terminal carbon atoms of the butadiene nucleus bears an amino group and an alkylmercapto group of not more than 7 carbon atoms.

18. Process for preparing 2,5-bis(beta-hydroxyethylmercapto)-3,4-dicyanopyrrole which comprises contacting an aqueous solution of a strong mineral acid having a pKa of no greater than 3 with 1,4-diamino-1,4-bis (beta - hydroxyethylmercapto) - 2,3 - dicyanobutadiene.

19. Process for preparing 2,5-bis(beta-chloroethylsulfonyl)-3,4-dicyanopyrrole which comprises contacting an aqueous solution of hydrochloric acid and hydrogen peroxide with 1,4-diamino-2,3-dicyano-1,4-bis(beta-hydroxyethylmercapto)butadiene.

20. Process for preparing 2,5-bis(methylmercapto)-3,4-dicyanopyrrole which comprises contacting an aqueous solution of a strong mineral acid having a pKa of no greater than 3 with 1,4-diamino-1,4-bis(methylmercapto)-2,3-dicyanobutadiene.

21. Process for preparing 2,5-bis(ethylmercapto)-3,4-dicyanopyrrole which comprises contacting an aqueous solution of a strong mineral acid having a pKa of no greater than 3 with 1,4-diamino-1,4-bis(ethylmercapto)-2,3-dicyanobutadiene.

22. Process for preparing 2,5-bis(beta-hydroxyethylmercapto)-3,4-dicyanopyrrole which comprises contacting an aqueous solution of hydrochloric acid with 1,4-diamino-1,4 - bis(beta - hydroxyethylmercapto) - 2,3-dicyanobutadiene.

No references cited.

UNITED STATES PATENT OFFICE

CERTIFICATE OF CORRECTION

Patent No. 2,793,215                                                    May 21, 1957

William J. Middleton

It is hereby certified that error appears in the printed specification of the above numbered patent requiring correction and that the said Letters Patent should read as corrected below.

Column 2, line 6, for "(pyridilium-alkyl)" read —(pyridilium-alkyl-thio)—; lines 12 and 13, for that portion of the formula reading "(O=)S-" read — (O=)$_n$S- —; column 7, line 27, before "cardinal" insert —a—; line 64, for "nucleus bear" read —nucleus bears—.

Signed and sealed this 6th day of August 1957.

(SEAL)
Attest:
KARL H. AXLINE

Attesting Officer

ROBERT C. WATSON
Commissioner of Patents